United States Patent
Dold et al.

(10) Patent No.: US 6,704,899 B1
(45) Date of Patent: Mar. 9, 2004

(54) METHOD AND DEVICE FOR SECURE TRANSMISSION OF DATA SIGNALS OVER A BUS SYSTEM

(75) Inventors: Franz Josef Dold, Furtwangen (DE); Jens Niehus, Strasbourg (FR); Martin Geiler, Gutach (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 09/569,469

(22) Filed: May 12, 2000

(30) Foreign Application Priority Data

May 17, 1999 (DE) ......................... 199 22 561

(51) Int. Cl.$^7$ ............................. H03M 13/00
(52) U.S. Cl. ....................... 714/752; 714/758
(58) Field of Search ................. 714/746, 751, 714/752, 758, 721, 799, 819, 820, 821, 712

(56) References Cited

U.S. PATENT DOCUMENTS

| 5,408,217 A | 4/1995 | Sanderford, Jr. |
| 5,917,840 A | 6/1999 | Cheney ........................ 371/53 |
| 6,084,888 A | * 7/2000 | Watanabe et al. ........... 370/473 |
| 6,381,713 B1 | * 4/2002 | Irvin et al. .................. 714/701 |

FOREIGN PATENT DOCUMENTS

| DE | 196 14 654 C1 | 8/1997 |
| DE | 196 52 256 A1 | 6/1998 |
| DE | 198 15 147 A1 | 10/1998 |
| DE | 198 15 148 A1 | 10/1998 |
| DE | 198 15 150 A1 | 10/1998 |
| DE | 19814102 A1 | 12/1998 |
| EP | 0837394 A2 | 4/1998 |
| WO | WO 99/36840 A1 | 7/1999 |

OTHER PUBLICATIONS

H. Mohlenbein, "INTERBUS–Dezentrale Echtzeit–Peripherie Fuer Standard–SPS–Systeme" 1990, Elektrie, Veb Verlag Technik Berlin, DD vol. 44, No. 7, pp. 244–249 (Not in English).

E. Flaschka, "Binare Sensoren am Bus Mit ASI eine durchgangige Datenubertragung bis zum einfachen Sensor" 1994, Elektronik, Franzis Verlag GmbH. Muchen, DE vol. 43, No. 12 pp. 64–68 (Not in English).

* cited by examiner

Primary Examiner—Christine T. Tu
(74) Attorney, Agent, or Firm—Townsend and Townsend and Crew, LLP

(57) ABSTRACT

A method of secure transmission of data signals over a bus system is described, where the data signals are generated by at least one sensor and are transmitted over the bus system to at least one actuator. The data signals generated by at least one of the sensors are encoded according to a predetermined secure encoding method before being introduced into the bus system. The encoded data signals are fed into the bus system and transmitted over it. The encoded data signals are received by at least one of the actuators and decoded according to a decoding method corresponding to the predetermined secure encoding method. In addition, an electronic monitoring system is described for carrying out this method.

20 Claims, 1 Drawing Sheet

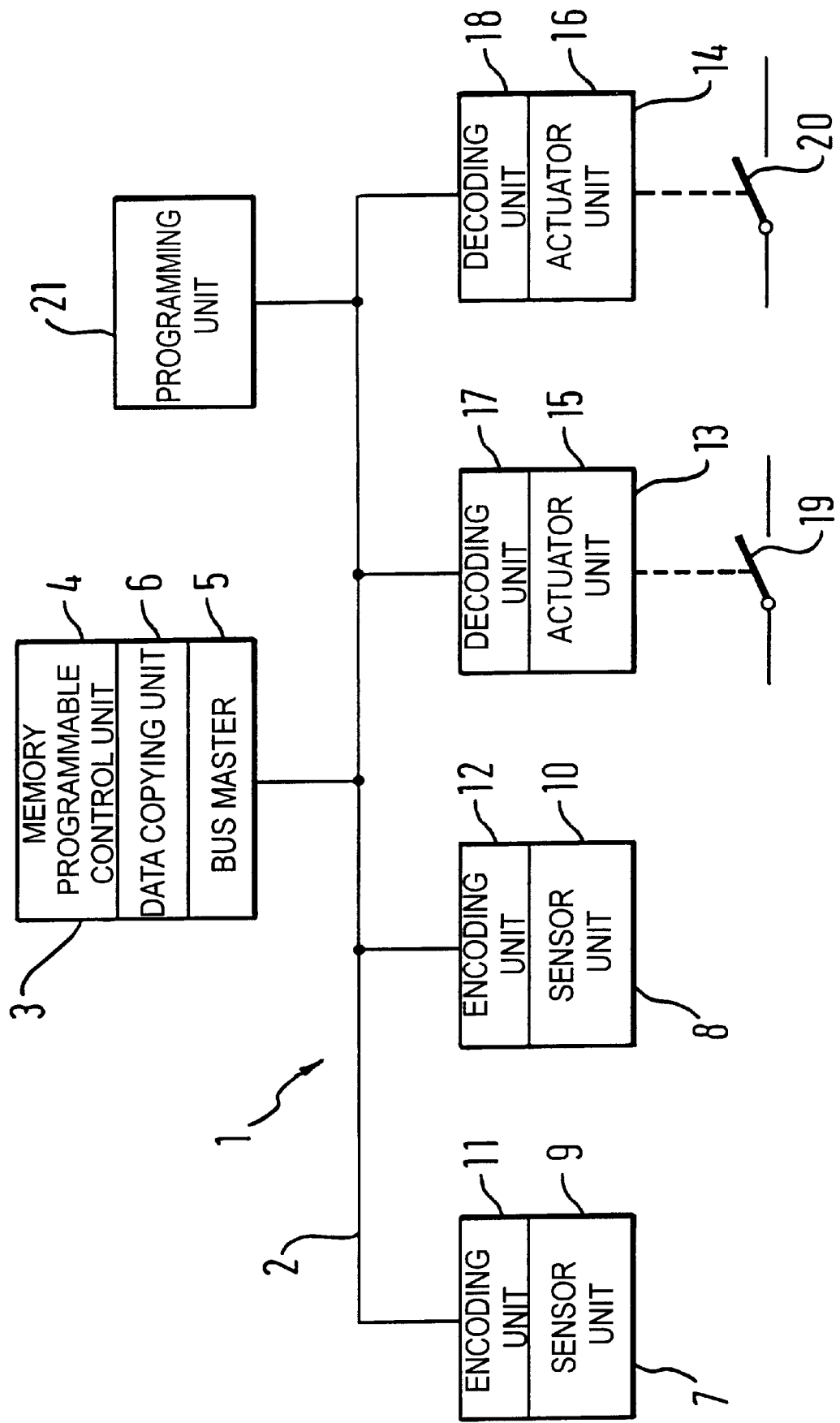

METHOD AND DEVICE FOR SECURE TRANSMISSION OF DATA SIGNALS OVER A BUS SYSTEM

BACKGROUND OF THE INVENTION

The present invention concerns a method of secure transmission of data signals over a bus system, wherein the data signals are generated by at least one sensor and are transmitted over the bus system to at least one actuator. In addition, this invention also concerns an electronic monitoring system having at least one sensor and at least one actuator which are connected to one another over a bus system for data transmission, where the data signals to be transmitted are generated by the sensors, fed into the bus system and received by the actuators, so that the actuators can be controlled by the sensors over the bus system.

Such a method and such a monitoring system are used in automation technology, for example. With the increasing use of bus systems in automation technology, it is necessary to be able to transmit data relevant to security over these bus systems in accordance with security standard EN954, for example.

One possibility for such a secure transmission consists of coupling a secure SPS (SPS=memory programmable control system) to secure sensors and actuators over the databus. Both the secure SPS and the secure sensors and actuators must conform to the security requirements according to EN954, where linking operations (such as OR, XOR, AND and timer) can be carried out by the secure SPS at the same time.

One disadvantage of such a constellation is the high response time due to the complicated communication between the secure sensors and the secure SPS on the one hand and the secure SPS and the secure actuators on the other hand, as well as the requirement that a complicated secure SPS must be used instead of a standard SPS. In addition, the bus master must also comply with the EN954 security standard when using a monomaster bus system, i.e. a bus system having only one allowed bus master. In this case, the secure SPS must handle secure functions as well as non-secure functions.

Another possibility for secure transmission is to provide a bus monitor which monitors the data transmission between the sensors and the bus master. In this an individual code is imposed on the data by the bus master and is checked by the passive bus monitor. If the bus monitor finds an error in the code, the actuators are driven accordingly, with a working device connected to the actuators being shut down, for example.

A disadvantage of such a system is that the bus monitor cannot act over the bus but instead can act on the respective actuators only directly. This requires additional cabling between the bus monitor and the actuators to be switched. In addition, the bus monitor is only passively connected to the bus, so it cannot transmit any data on the bus.

When using secure sensors, it is also possible for the data signals supplied to the bus by the sensors to be processed in a standard SPS and then sent on to the actuators, where the data transmission on the bus is monitored by an additional monitoring unit. A copy of the SPS program may be provided in this monitoring unit, so that the data generated by the standard SPS can be compared continuously with the corresponding data generated by the monitoring unit. If an error occurs in the data transmission or in the SPS, the monitoring unit recognizes this error and controls the actuators accordingly, e.g. for shutting down a working device.

One disadvantage of this system is the long response time of the monitoring unit, which depends directly on the program cycle time of the SPS. Due to this long response time, this system is not suitable for applications requiring speed. Another disadvantage is that the security program must be installed twice, namely once in the SPS and once as a copy in the monitoring unit, and furthermore the two programs must run in complete synchronization.

Since the monitoring unit can act on the actuator only directly, this solution also requires additional cabling between the monitoring unit and the actuators to be switched.

SUMMARY OF THE INVENTION

An object of the present invention is to provide a method and a monitoring system of the type defined in the preamble, such that a secure data transmission between the sensors and the actuators is guaranteed, in particular in accordance with security standard EN954, while at the same time omitting a complicated secure SPS and additional cabling to the actuators.

The part of the object of the present invention concerning the method is achieved according to this invention starting from a method of the type defined in the preamble such that before the data signals are introduced into the bus system, the data signals generated by at least one of the sensors are encoded according to a preselected secure encoding method which feeds the encoded data signals into the bus system over which they are transmitted, and the encoded data signals are received by at least one of the actuators and decoded according to a decoding method corresponding to the preselected secure encoding method.

The part of the object of this invention concerning the monitoring system is achieved by a monitoring system of the type defined in the preamble according to this invention by the fact that a respective secure encoding unit is provided for at least some of the sensors, so that the data signals generated by the respective sensor can be encoded before being fed into the bus system. The bus system is designed for transmitting the encoded data signals, and a respective secure decoding unit is provided for at least some of the actuators so that the encoded data signals transmitted over the bus system to the respective actuator can be decoded.

Thus, according to this invention, secure communication takes place directly between the sensor and actuator. By coding, the data is generated "securely" before being fed into the bus system, then is relayed "non-securely" from the bus master to the respective actuator and is checked "securely" by the decoding only in the actuator.

These security measures are thus limited to the "secure actuators" and "secure sensors" ("secure" in accordance with EN954) so that a complicated secure SPS can be omitted. Thus, the system according to this invention remains independent of the non-secure communication of the standard components on the bus system.

Since the data security is provided in the terminal components, i.e. in the sensors and/or the actuators, the transmission of the data signals by the bus master over the bus system can take place directly and in a non-secure, unprocessed manner. Thus, there is no security-relevant processing of the data signals in the standard SPS.

The security-oriented allocation and/or connection between the data terminals, e.g. between any two sensors, actuators or secure switching devices which can function as input or output components on the bus system, can take place in these secure terminal components with optional preliminary processing. Linking operations such as AND, OR, XOR or timer can be implemented in this way.

Another advantage of this invention is that existing non-secure bus components can be retrofitted with suitable secure sensors and actuators without having to modify the non-secure bus components. The bus master has only the function of copying data from the secure sensor to the respective secure actuator. With multimaster bus systems, the relaying of data over the bus master is also eliminated, because the secure terminal components respond directly to one another mutually.

Since the complex interlinking functions can be handled in a decentralized manner, no additional parallel wiring to the actuators is necessary, so the typical advantages of a bus system, namely reduced cabling, greater diagnosing capability and lower planning expense, are provided.

Since no complicated and expensive secure SPS is necessary, a monitoring system designed according to this invention has very short response times, so it is also suitable for use in time-critical applications.

This invention can be used with any desired systems, preferably the following: Interbus, CAN-based bus systems, Ethernet bus systems, in particular with TCP/IP protocol, Internet systems, Profibus and ASI bus.

The encoded data signals are preferably transparently transmitted over the bus system. In the case of a faulty decoding, the respective actuator is advantageously brought into an error status, in particular a device controlled by the actuator is shut down. For example, this achieves the result that a security-critical working device is automatically shut down when there is an interruption in one of a plurality of light barriers due to penetration of an object into a monitoring area.

In another advantageous embodiment of this invention, coding is performed directly by the respective sensor and/or decoding is performed directly by the respective actor. This permits a compact design of a monitoring system designed according to this invention. However, it is essentially also possible for the signals generated by the respective sensors to be encoded by a separate coding unit before being fed into the bus system and/or for encoded data signals transmitted over the bus system to be decoded by a separate decoding unit and relayed to the respective actuator.

Both the respective secure encoding method for each sensor and/or actuator as well as the respective assignments and/or interlinking functions of the individual sensors or actuators can be programmed variably for each sensor and/or actuator according to this invention. Any desired number of combinations of the respective terminals is possible. The configuration data can be transmitted from one programming unit to the respective terminal components by direct connection to the bus or by way of the secure programmable control system and the bus connected to the latter.

BRIEF DESCRIPTION OF THE DRAWINGS

FIG. 1 is a schematic diagram which illustrates the present invention.

DESCRIPTION OF THE PREFERRED EMBODIMENTS

FIG. 1 shows a bus system 1, comprising a databus 2 and a bus control 3. The bus control 3 includes a standard SPS (memory programmable control system) 4, a bus master 5 and a data copying unit 6 with which the data generated by SPS 4 is sent to the bus master 5. SPS 4 is connected to databus 2 by way of bus master 5 for controlling data traffic on the databus 2.

In addition, sensors 7, 8 are connected to databus 2, the sensors 7, 8 consisting of the actual sensor unit 9, 10 and a respective secure encoding unit 11, 12, as shown schematically. The secure encoding units 11, 12 are implemented by a software security layer, for example, by means of which the data signals generated by sensors 7, 8 are encoded before being fed into bus system 1. For data security, different security mechanisms such as checksum, a running number, expected time with acknowledgment or a source-target relationship may be provided in the different security layers.

The encoded data signals may be transmitted on the databus 2, e.g. with a data length of eight bytes, where four bytes, for example, may be used for information data and four bytes for security measures.

In addition, two actuators 13, 14 are connected to databus 2, each actuator consisting of the actual actuator units 15, 16 and secure decoding units 17, 18. The secure decoding units may be implemented as software security layers, for example as with sensors 7, 8, so that data signals transmitted over the databus 2 and encoded by secure encoding units 11, 12 can be decoded.

Any desired terminals can be controlled by actuators 13, 14, as indicated schematically by two switches 19, 20. In particular, security-critical working devices can be shut down automatically in this way when sensors 7, 8 respond due to an interruption in a beam of light of a light barrier, for example.

In addition, a programming unit 21, e.g. in the form of a personal computer PC, is also connected to the bus system 1, so that the secure encoding units 11, 12 and the secure decoding units 17, 18 can be programmed. First, the encoding methods used can be stored in the secure encoding units 11, 12 and secure decoding units 17, 18, and second, the required linking operations of the security components can be established.

For example, at first all the relevant security components can be identified by programming unit 21 and provided with their respective security functions (muting, security monitoring, blanking, emergency off) through the configuration. The required linking operations of the security components (e.g. AND, OR, XOR, timer) can be created by a network editor, for example. From the parameterization data and the network data, a function package can be created for each security component by the programming logic of programming unit 21 and allocated to each component, i.e. sensors 7, 8 and/or actuators 13, 14, over the data bus. An automatic distribution of the security functions throughout the entire system is possible in this way.

A completely variable definition of the linking operations is possible due to the use of a programming unit 21. Examples of linking operations include:

1. Sensor 7 and sensor 8 act on actuator 13.
2. Sensor 7 acts on actuator 13 and actuator 14.
3. Sensor 7 and sensor 8 and a switching unit (not shown) act on actuator 13 and actuator 14.

The actuators monitor only the sensors allocated to them with the corresponding data in accordance with the programmed function. The analysis of the linking functions is performed in the actuators for Example 1 and in the sensors for Example 2. As shown in Example 3, combinations are also possible, so that the analysis can be performed in both the sensors and the actuators. With the system according to this invention, there can be any desired number of communication relationships and thus also security relationships on the bus system 1, being limited only by the performance data on the bus system 1.

Through the security measure described here, errors such as data repetition, loss, insertion, false sequence, corruption, delay and coupling of non-security-relevant data to security-relevant data can be controlled. The security links may optionally be implemented either in the security layer or, as an alternative or in addition, in the software of the secure terminal components.

Bus master 5 has the function of organizing the data or relaying the data between the secure input and output components. This data organization may take place in the software or in the programmable hardware or even directly in the ASIC of bus master 5. This data organization and relaying can take place in an unsecured manner, because data security is provided directly in terminal components 7, 8, 13, 14.

What is claimed is:

1. A method for the secure transmission of data signals between at least one sensor and at least one actuator over a bus system comprising generating the data signals at the at least one sensor, encoding the data signals with a predetermined security code to form encoded data signals, thereafter feeding the encoded data signals directly into the bus system and transmitting the encoded data signals over the bus system to the at least one actuator, and decoding the encoded data signals at the at least one actuator in accordance with the predetermined security code.

2. A method according to claim 1 wherein the encoded data signals are transmitted in a transparent manner over the bus system.

3. A method according to claim 1 including placing the at least one actuator into an error state in response to a faulty decoding.

4. A method according to claim 3 including operatively coupling a device with the at least one actuator and shutting down the device with the at least one actuator when the at least one actuator is placed into the error state.

5. A method according to claim 1 wherein the encoding is performed directly by the at least one sensor.

6. A method according to claim 1 wherein the decoding is performed directly by the at least one actuator.

7. A method according to claim 1 wherein the predetermined security code is adjustable for the at least one sensor and/or the at least one actuator.

8. A method according to claim 1 including providing a plurality of sensors and a plurality of actuators which are each programmable and variably allocating the sensors and the actuators to one another.

9. A method according to claim 1 including establishing a predetermined number of bits or bytes for the transmission of the data signals over the bus system, and using some of the bits or bytes for encoding the data signals.

10. A method according to claim 1 including controlling the transmission of the encoded data signals over the bus system with a non-secure programmable control unit.

11. A method according to claim 10 including operating the bus system according to the master-slave principle in which the at least one sensor and/or the at least one actuator form the slaves and the programmable control unit forms the master.

12. An electronic monitoring system for the secure transmission of data signals comprising at least one sensor for generating the data signals and at least one actuator for receiving and responding to the data signals, a bus system connecting the at least one sensor and the at least one actuator for data transmission so that the at least one actuator can be controlled by the at least one sensor, a secure encoding unit associated with the at least one sensor for encoding the data signals generated by the at least one sensor with a predetermined security code before feeding the encoded data signals directly into the bus system, the bus system transmitting the encoded data signals to the at least one actuator, and a secure decoding unit associated with the at least one actuator for decoding the encoded data signals received by the at least one actuator from the bus system.

13. An electronic monitoring system according to claim 12 wherein the bus system is configured for the transparent transmission of the encoded data signals.

14. An electronic monitoring system according to claim 12 wherein the secure encoding unit is integrated directly into the at least one sensor.

15. An electronic monitoring system according to claim 12 wherein the secure decoding unit is integrated directly into the at least one actuator.

16. An electronic monitoring system according to claim 12 wherein the secure encoding unit is formed by a programmable control unit of the at least one sensor.

17. A electronic monitoring system according to claim 16 including a central programming unit connected to the bus system so that the programmable control units of the at least one sensor and/or of the at least one actuator are programmed by the programming unit.

18. An electronic monitoring system according to claim 12 wherein the secure decoding unit is formed by a programmable control unit of the at least one actuator.

19. An electronic monitoring system according to claim 12 including a non-secured, standard, programmable control unit for controlling the bus system.

20. An electronic monitoring system according to claim 19 wherein the bus system is configured to operate according to the master-slave principle, the at least one sensor and/or the at least one actuator form the slaves, and the programmable control unit forms the master.

* * * * *